US 9,449,226 B2

(12) United States Patent
Aizawa et al.

(10) Patent No.: US 9,449,226 B2
(45) Date of Patent: Sep. 20, 2016

(54) INFORMATION PROCESSING DEVICE

(75) Inventors: Kiyoharu Aizawa, Tokyo (JP);
Toshihiko Yamasaki, Tokyo (JP);
Keigo Kitamura, Kawasaki (JP);
Tatsuya Miyazaki, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 113 days.

(21) Appl. No.: 13/700,873

(22) PCT Filed: May 31, 2011

(86) PCT No.: PCT/JP2011/062481
§ 371 (c)(1),
(2), (4) Date: Feb. 7, 2013

(87) PCT Pub. No.: WO2011/152394
PCT Pub. Date: Dec. 8, 2011

(65) Prior Publication Data
US 2013/0170714 A1   Jul. 4, 2013

(30) Foreign Application Priority Data

May 31, 2010   (JP) .................................. 2010-124361
Dec. 14, 2010   (JP) .................................. 2010-278648

(51) Int. Cl.
*G06K 9/00*      (2006.01)
*G06F 17/30*     (2006.01)

(52) U.S. Cl.
CPC ..... *G06K 9/00624* (2013.01); *G06F 17/30256* (2013.01)

(58) Field of Classification Search
CPC ....................................................... G06K 9/00
USPC ......................................................... 382/110
See application file for complete search history.

(56) References Cited

U.S. PATENT DOCUMENTS

2009/0304267 A1*  12/2009  Tapley et al. ................. 382/156
2013/0260345 A1*  10/2013  Puri et al. ...................... 434/127

FOREIGN PATENT DOCUMENTS

| JP | A-2002-073818 |   | 3/2002 |
| JP | A-2004-118562 |   | 4/2004 |
| JP | A-2006-105655 |   | 4/2006 |
| JP | A-2006-171984 |   | 6/2006 |
| JP | 2007/122311   | * | 5/2007 |
| JP | A-2007-122311 |   | 5/2007 |

OTHER PUBLICATIONS

Kitamura et al., "Contents-based image retrieval on food images," *Information Processing Society of Japan*, pp. 3-173-3-174, Mar. 18, 2010.

(Continued)

*Primary Examiner* — Stephen R Koziol
*Assistant Examiner* — Delomia L Gilliard
(74) *Attorney, Agent, or Firm* — Oliff PLC

(57) ABSTRACT

To provide an information processing device for outputting estimated nutrition value information on at least one dish or a drink through simplified processing. The information processing device holds as reference information a captured image of at least one dish or a drink and nutrition value information set for the item of food or drink included in the image so as to be correlated to each other, receives an image including at least one dish or a drink, and retrieves a plurality of images similar to the image received from among the reference information held. Further, the information processing device calculates a statistic of a plurality of nutrition value information pieces correlated to the plurality of respective images retrieved, and outputs the statistic calculated.

4 Claims, 11 Drawing Sheets

(56) References Cited

OTHER PUBLICATIONS

Aizawa, Kiyoharu, "Life Log," *Information Processing Society of Japan*, vol. 50, No. 7, pp. 592-597, Jul. 15, 2009.
International Preliminary Report on Patentability issued in Application No. PCT/JP2011/062481; Dated Jan. 8, 2013 (With Translation).
International Search Report issued in Application No. PCT/JP2011/062481; Dated Jul. 5, 2011 (With Translation).
Szuba, Tadeusz, M., Computational Collective Intelligence, A Wiley-Interscience Publication, New York, NY, USA, 2001 (Entire Book).

\* cited by examiner

FIG. 2

| IMAGE INFORMATION | NUTRITION VALUE INFORMATION |
|---|---|
|  | 250Cal |
|  | 500Cal |
| -------- | -------- |

INFORMATION PROCESSING DEVICE

TECHNICAL FIELD

The present invention relates to an information processing device for outputting estimated nutrition value information on at least one dish or a drink.

TECHNICAL FIELD

Patent Document 1 discloses an idea that the kind (a croquette, or the like) and amount of food is recognized based on an image thereof, and the calorie of that kind of food in the recognized amount is calculated.

Further, Patent Document 2 discloses a technique for retrieving a similar meal in contents among meals in the past in order to assist a worker determining a calorie value while looking at a captured image.

RELATED ART DOCUMENT

Patent Document

Patent Document 1: Japanese Patent Laid-open Publication No. 2007-122311
Patent Document 2: Japanese Patent Laid-open Publication No. 2002-073818

Non-Patent Document

Non-Patent document 1]: Szuba T., Computational Collective Intelligence, Wiley NY, 2001

BACKGROUND ART

Problem to be Solved by the Invention

However, according to the above described conventional technique, as identification of the kind and amount of food is inevitable, complicated image processing is resulted or a worker ultimately performs image processing, as described above.

The present invention has been conceived in view of the above, and one of the objects thereof is to provide an information processing device for outputting estimated nutrition value information on at least one dish or a drink through simplified processing.

DISCLOSURE OF INVENTION

Means to Solve the Problem

In order to solve a problem of the above mentioned conventional art, there is provided an information processing device comprising a holding unit for holding as reference information a captured image of at least one dish or a drink and nutrition value information set for the item of food or drink included in the image, so as to be correlated to each other; a unit for receiving an image including at least one dish or a drink; and a retrieving unit for retrieving a plurality of images similar to the image received from the reference information held in the holding unit; a unit for calculating a statistic of a plurality of nutrition value information pieces correlated to the plurality of respective images retrieved; and a unit for outputting the statistic calculated.

Advantage of Invention

According to the present invention, as a result as collective intelligence can be obtained without identification of the kind or amount of food or estimation of a nutrition value by a well-trained worker, it is possible to simplify the processing for outputting estimated nutrition value information of at least one dish or a drink.

BRIEF DESCRIPTION OF DRAWINGS

FIG. 2 explains example content of reference information for use in an information processing device according to an embodiment of the present invention;

BEST MODE FOR CARRYING OUT THE INVENTION

Figure 1:
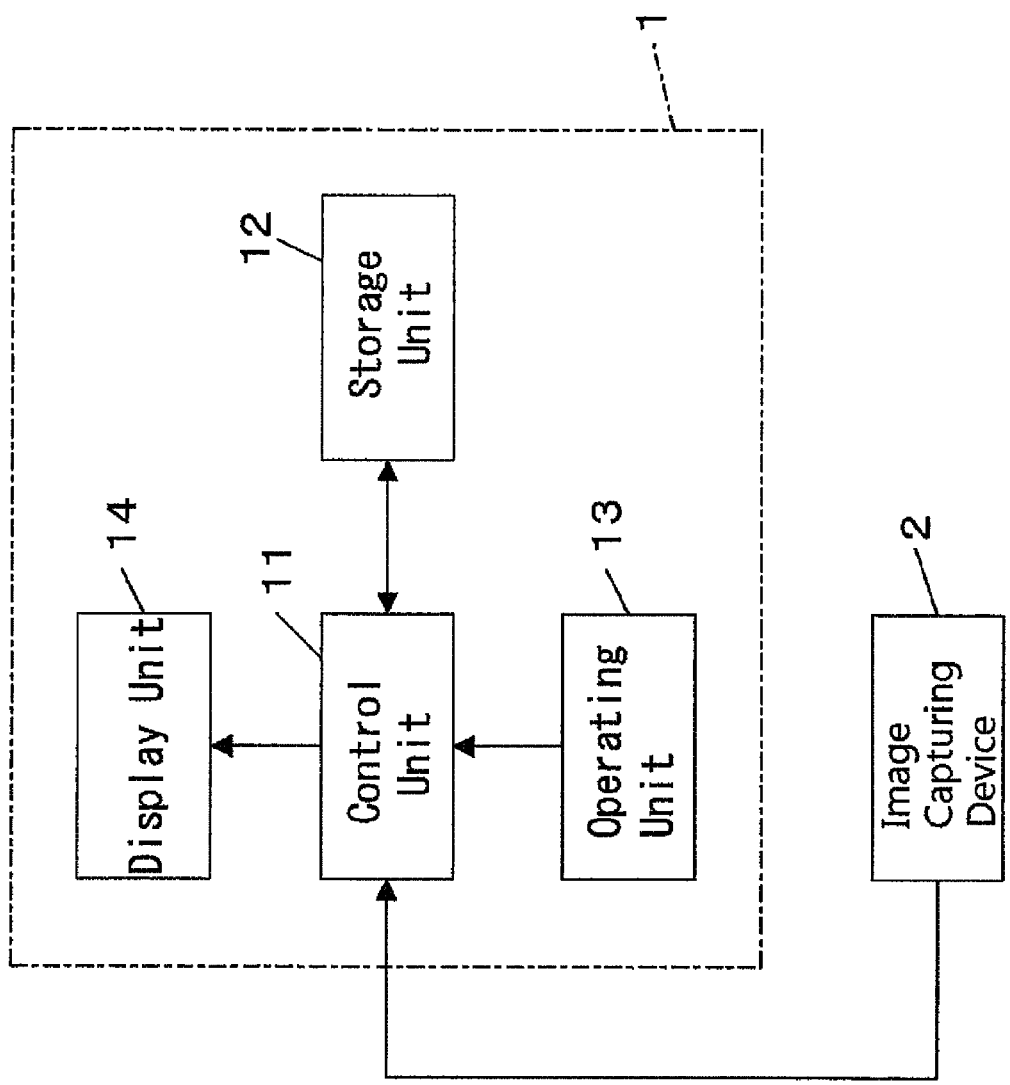
FIG. 1 is a block diagram showing a structure of an information processing device according to an embodiment of the present invention and an example connection therefor.

An embodiment of the present invention will be described referring to the drawings. According to one aspect of this embodiment, the information processing device comprises a holding unit for holding as reference information a captured image of at least one dish or a drink and nutrition value information set for the item of food or drink included in the image, so as to be correlated to each other; a unit for receiving an image including at least one dish or a drink; and a retrieving unit for retrieving a plurality of images similar to the image received from the reference information held in the holding unit; a unit for calculating a statistic of a plurality of nutrition value information pieces correlated to the plurality of respective images retrieved; and a unit for outputting the statistic calculated.

According to another aspect of the embodiment, the retrieving unit may retrieve the plurality of images, using a plurality of mutually different similar image retrieving methods.

According to still another aspect, the holding unit may include an N ($N \geq 2$) number of holding unit elements for holding mutually different reference information pieces, and the retrieving unit may retrieve the plurality of images from an M (N>=M>=2) number of holding unit elements selected from among the N number of holding unit elements.

A program according to an embodiment of the present invention causes a computer to function as an information processing device, comprising a holding unit for holding as reference information a captured image of at least one dish or a drink and nutrition value information set for the item of food or drink included in the image, so as to be correlated to each other; a unit for receiving an image including at least one dish or a drink; and a retrieving unit for retrieving a plurality of images similar to the image received from the reference information held in the holding unit; a unit for calculating a statistic of a plurality of nutrition value information pieces correlated to the plurality of respective images retrieved; and a unit for outputting the statistic calculated.

Studies have been made on an idea referred to as collective intelligence (e.g., http://cci.mit.edu/index.html) under an idea that people and computers can provide higher intelligence when behaving and acting in a group rather than individually. In addition, studies on mathematical modeling of this idea have been conducted (non-Patent Document 1). In the studies of mathematical modeling, an example has been mentioned in which a unit of abstract processing for processing expression of mathematical logic is executed at semi-random.

As shown in FIG. 1, an example of an information processing device 1 according to an embodiment of the present invention includes a control unit 11, a storage unit 12, an operating unit 13, and a display unit 14, and is connected to an image capturing device 2. Although the image capturing device 2 is a separate entity from the information processing device 1 here, the information processing device 1 may have an integral image capturing device 2. Further, although the information processing device 1 receives image information from the image capturing device 2 in this embodiment, the information processing device 1 may receive image information to be processed from another image processing device (PC or the like) via, for example, a network or the like.

The control unit 11 is a program control device, such as a CPU or the like, and operates according to a program stored in the storage unit 12. The control unit 11 in this embodiment receives an image of at least one dish or a drink captured by the image capturing device 2, then retrieves a plurality of images similar to the received image from among prepared image information pieces, and calculates and outputs a statistic of nutrition value information pieces that are recorded in advance so as to be correlated to the respective image information pieces retrieved. Details on the processing by the control unit 11 will be described later.

As shown as an example in FIG. 2, the storage unit 12 stores a captured image of at least one dish or a drink and estimated nutrition value information of the item of food or drink included in the captured image so as to be correlated to each other as reference information. Further, the storage unit 12 holds a program to be executed by the control unit 11. The storage unit 12 operates also as a working memory of the control unit 11.

The operating unit 13 includes a keyboard, a touch panel, or the like, and receives an operation by a user, and outputs content of the operation to the control unit 11. The display unit 14 is a display or the like, and shows and outputs information according to an instruction input from the control unit 11.

The image capturing device 2 is a camera having an optical sensor, such as a CCD, a CMOS, or the like, and outputs an image captured by the optical sensor as digitized image information.

In the following, content of processing by the control unit 11 will be described. As shown as an example in FIG. 3, the control unit 11 according to one example of this embodiment functionally includes a reference information obtaining unit 21, an image receiving unit 22, a similar image retrieving unit 23, a corresponding information obtaining unit 24, a statistic calculating unit 25, and an output unit 26.

The reference information obtaining unit 21 reads reference information stored in the storage unit 12. In one example of this embodiment, a plurality of reference information pieces are stored in one recording area, as shown in FIG. 2.

The image receiving unit 22 receives image information captured by the image capturing device 2. Then, according to a predetermined similar image retrieving method and using the image information received by the image receiving unit 22 as a retrieval key, the similar image retrieving unit 23 retrieves reference information including image information similar to the retrieval key from among the reference information pieces obtained by the reference information obtaining unit 21. As a specific example, the similar image retrieving unit 23 calculates the value of a predetermined image feature, based on the retrieval query image information. Note that as the image feature value, a feature value, such as, for example, a SIFT feature value (a SIFT feature value), or the like, that is independent of a scale, is available. Further, the similar image retrieving unit 23 causes the reference information obtaining unit 21 to sequentially read the reference information pieces stored in the storage unit 12, and calculates an image feature value, based on the image information included in each of the reference information pieces read. Note that the same kind of image feature value as that calculated based on the query image information is calculated here.

Still further, the similar image retrieving unit 23 compares the image feature value calculated based on the query image information and that calculated based on the image information included in each of the reference information pieces, and finds the L number of image information pieces corresponding to the upper L number of image feature values, beginning with one closest to the image feature value calculated based on the query image information, as similar images.

The corresponding information obtaining unit 24 obtains the L number of nutrition value information pieces corresponding to the L number of similar image information pieces found by the similar image retrieving unit 23, and outputs to the statistic calculating unit 25. The statistic calculating unit 25 calculates a statistic of the nutrition value information pieces input from the corresponding information obtaining unit 24, and outputs to the output unit 26. In an example of this embodiment, the nutrition value information is a calorie value, and the statistic calculating unit 25 calculates an average of the calorie values to output as a statistic. However, the statistic calculating unit 25 in this embodiment is not limited to the above described example, and may output the maximum value, the minimum value, the median, and any other calculated value, besides the average. The output unit 26 shows the information output from the statistic calculating unit 25 on the display unit 14 to output.

According to this example (hereinafter referred to as a first example), as to image information obtained by capturing an image of at least one dish or a drink, an estimated nutrition value is stored as reference information in the storage unit 12 so as to be correlated to the item of food or drink of the captured image.

Then, using newly captured image information of at least one dish or a drink as a key, the value of a predetermined kind of feature is calculated as to the query image information (the feature value calculated here is hereinafter referred to as a "key feature value"). In addition, the value of the same kind of feature is calculated as to the image information included in each of the reference information pieces, and the L number (two or more) of image information pieces are selected, beginning with one corresponding to a calculated feature value closer to the key feature value. Then, an estimated nutrition value included in the reference information together with the selected image information (that is, correlated to the selected image information) is read, and the L number of estimated nutrition values are obtained.

Figure 4:
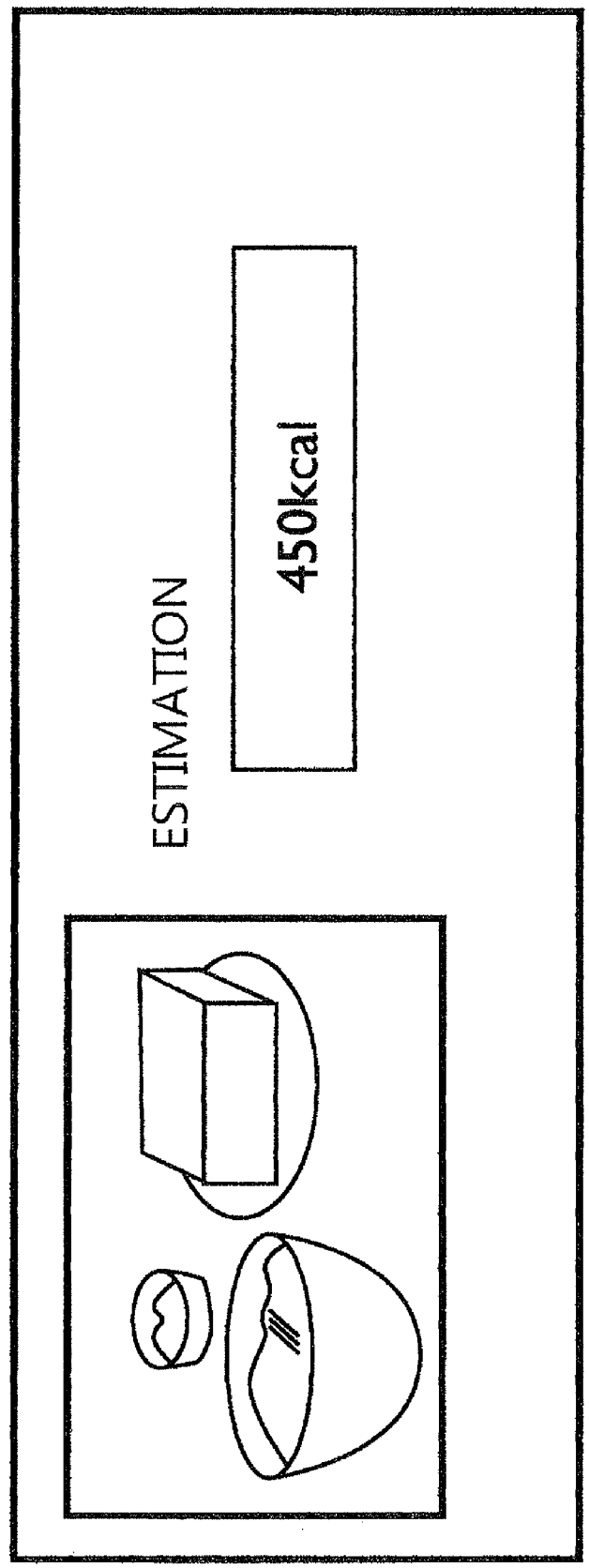
FIG. 4 explains an example of showing information by an information processing device according to an embodiment of the present invention.

The information processing device 1 calculates a statistical value, such as the average or the like, of the estimated values, and shows the calculated statistical value on the display unit 14 to thereby present to a user. Specifically, information on the calculated statistical value is shown together with the captured image of the item of food or drink (query image information) (FIG. 4).

In this embodiment, under the idea of collective intelligence, the estimated nutrition value included in each reference information piece stored in the storage unit 12 is not necessarily exactly correct, but a substantially correct value is sufficient as a statistic.

In the following, an operation of the information processing device 1 according to another example (hereinafter referred to a second example) of this embodiment will be described. As shown as an example in FIG. 5, the control unit 11 according to another example of this embodiment functionally includes the reference information obtaining unit 21, the image receiving unit 22, a similar image retrieving unit 23', the corresponding information obtaining unit 24, the statistic calculating unit 25, and the output unit 26. A structural element similar to that described above is given the same reference numeral, with a description thereof not repeated.

In this example as well, a plurality of reference information pieces are stored in one recording area, as shown in FIG. 2. In this example, the similar image retrieving unit 23' operates differently from the above described example. That is, according to a plurality of predetermined similar image retrieving methods and using the image information received by the image receiving unit 22 as a retrieval key, the similar image retrieving unit 23' in this example retrieves reference information including image information similar to the query image information from among the reference information pieces obtained by the reference information obtaining unit 21.

As a specific example, the similar image retrieving unit 23' calculates the values of the predetermined k (two or more) kinds of image features, based on the retrieval query image information. Note that as the image feature value, for example, a SIFT feature value (a SIFT feature value), a contour line, color distribution (average and dispersion of color phase, brightness, and saturation, covariance of brightness saturation, and the like), intensity gradient histogram, a direction element, Hough transform, and a combination thereof may be used.

Further, the similar image retrieving unit 23' causes the reference information obtaining unit 21 to sequentially read the reference information pieces stored in the storage unit 12, and similarly calculates the values of the k kinds of image features as to the image information included in each of the reference information pieces read. Note that the amounts of the same combination of the kinds of image feature values as those calculated based on the query image information are calculated here.

The similar image retrieving unit 23' compares the k kinds of image feature values calculated based on the query image information with the k kinds of image features values calculated based on the image information included in each of the reference information pieces, and finds, as to each kind of image feature value, the $L=\Sigma(Li)$ (the sum of Li, where $i=1, 2, \ldots k$) number of image information pieces corresponding to the top Li ($i=1, 2, \ldots k$; each Li being one or larger) number of image feature values in order of closeness to the image feature value calculated based on the query image information from closest to furthest, as similar images.

The corresponding information obtaining unit 24 obtains the L number of nutrition value information pieces correlated to the L number of similar images found by the similar image retrieving unit 23', and outputs to the statistic calculating unit 25. The statistic calculating unit 25 calculates a statistic of the nutrition value information pieces input from the corresponding information obtaining unit 24, and outputs to the output unit 26. The output unit 26 shows the information output from the statistic calculating unit 25 on the display unit 14 to output.

In the following, an operation of the control unit 11 according to a still another example (referred to as a third example) of this embodiment will be described. As shown as an example in FIG. 6, the control unit 11 according to the still another example of this embodiment functionally includes an n (two or more) number of reference information obtaining units 21', the image receiving unit 22, the n number of similar image retrieving unit 23, n being the same number as that of the reference information obtaining unit 21', the corresponding information obtaining unit 24, the statistic calculating unit 25, and the output unit 26. A structural element similar to that described above is given the same reference numeral, with a description thereof not repeated.

Figure 7:
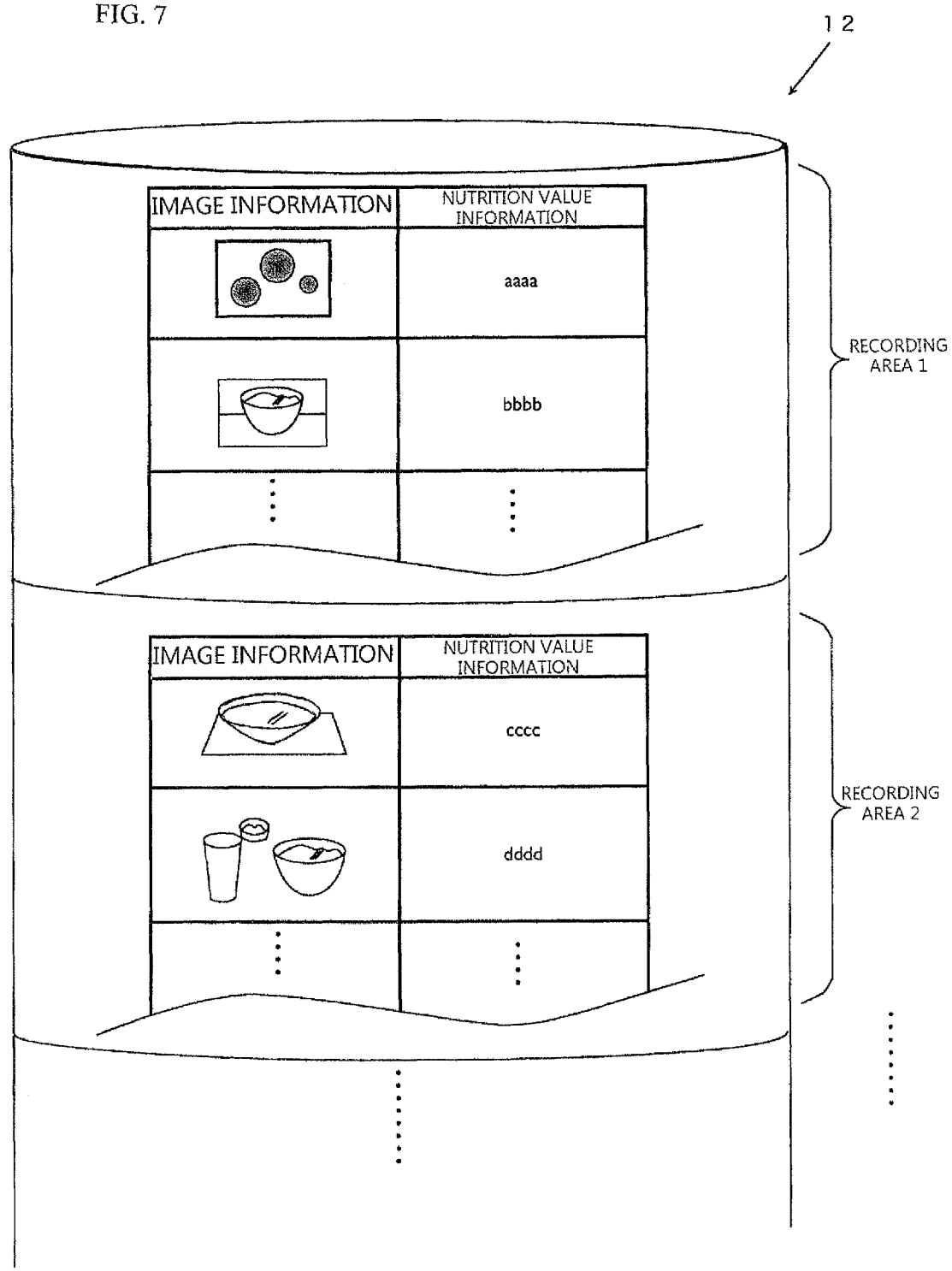
FIG. 7 explains another example of a manner of storing reference information in an information processing device according to an embodiment of the present invention.

In this example, different from the reference information shown in FIG. 2, a plurality of reference information pieces are stored in each of the n (two or more) number of recording areas ensured in the storage unit 12, as shown as an example in FIG. 7. In this case, the combination of reference information pieces stored in the respective recording areas differs from one another, though some may be the same.

In this example, the reference information obtaining units 21' are provided corresponding to the n number of respective recording areas, and each sequentially read reference information pieces from a corresponding recording area to output.

The similar image retrieving units 23 are provided respectively corresponding to the respective reference information obtaining units 21'. The similar image retrieving unit 23 calculates an image feature value, based on the query image information, compares the image feature value calculated based on the query image information with image feature values calculated based on pieces of image information contained in the pieces of reference information output from the corresponding reference information obtaining unit 21', and finds out the Li number of image information as similar images (wherein i represents a different integer for respective similar image retrieving unit 23, and satisfies $i=1, 2, \ldots n$, and Li being one or larger), the Li number of image information corresponding to the top Li number of image feature values in order of closeness to the image feature value calculated based on the query image information, from closest to furthest.

The corresponding information obtaining unit 24 obtains the L number of nutrition value information pieces correlated to the L=Σ(Li) (the sum of Li, where i=1, 2, . . . n) number of respective similar images found by each similar image retrieving unit 23, and outputs to the statistic calculating unit 25. The statistic calculating unit 25 calculates a statistic of the nutrition value information pieces input from the corresponding information obtaining unit 24, and outputs to the output unit 26. The output unit 26 shows the information output from the statistic calculating unit 25 on the display unit 14 to output.

In this example, the similar image retrieving unit 23' using a plurality of kinds of image feature values, described in the above example, may be used instead of the similar image retrieving unit 23 (referred to as a fourth example). In this case as well, the similar image retrieving unit 23' calculates the values of the predetermined k (two or more) kinds of image features, based on the retrieval query image information. Note that as the image feature value, for example, a SIFT feature value (a SIFT feature value), a contour line, color distribution (average and dispersion of color phase, brightness, and saturation, covariance of brightness saturation, and the like), intensity gradient histogram, a direction element, Hough transform, and a combination thereof may be used.

Further, the similar image retrieving unit 23' causes the reference information obtaining unit 21' to sequentially read the reference information pieces stored in the corresponding recording area in the storage unit 12, and similarly calculates the k kinds of image feature values as to the image information included in each of the reference information pieces read. Note that the same combination of the kinds of image feature values as that of the image feature value calculated based on the query image information is used here.

Then, the image retrieving unit 23' compares the k kinds of respective image feature values calculated based on the query image information with the k kinds of respective image feature values calculated based on pieces of the image information contained in the piece of reference information output from the corresponding reference information obtaining unit 21', and finds, as to each kind of image feature value, the Li=Σ(Pj) (the sum of Pi, j=1, 2, . . . k) number of pieces of image information as similar images, the Pj number of pieces of image information corresponding to the top Pj (j=1, 2, . . . k; each Pj being one or larger) number of image feature values, in order of closeness to the image feature value calculated based on the query image information, from closest to furthest.

[Operation]

Figure 8:
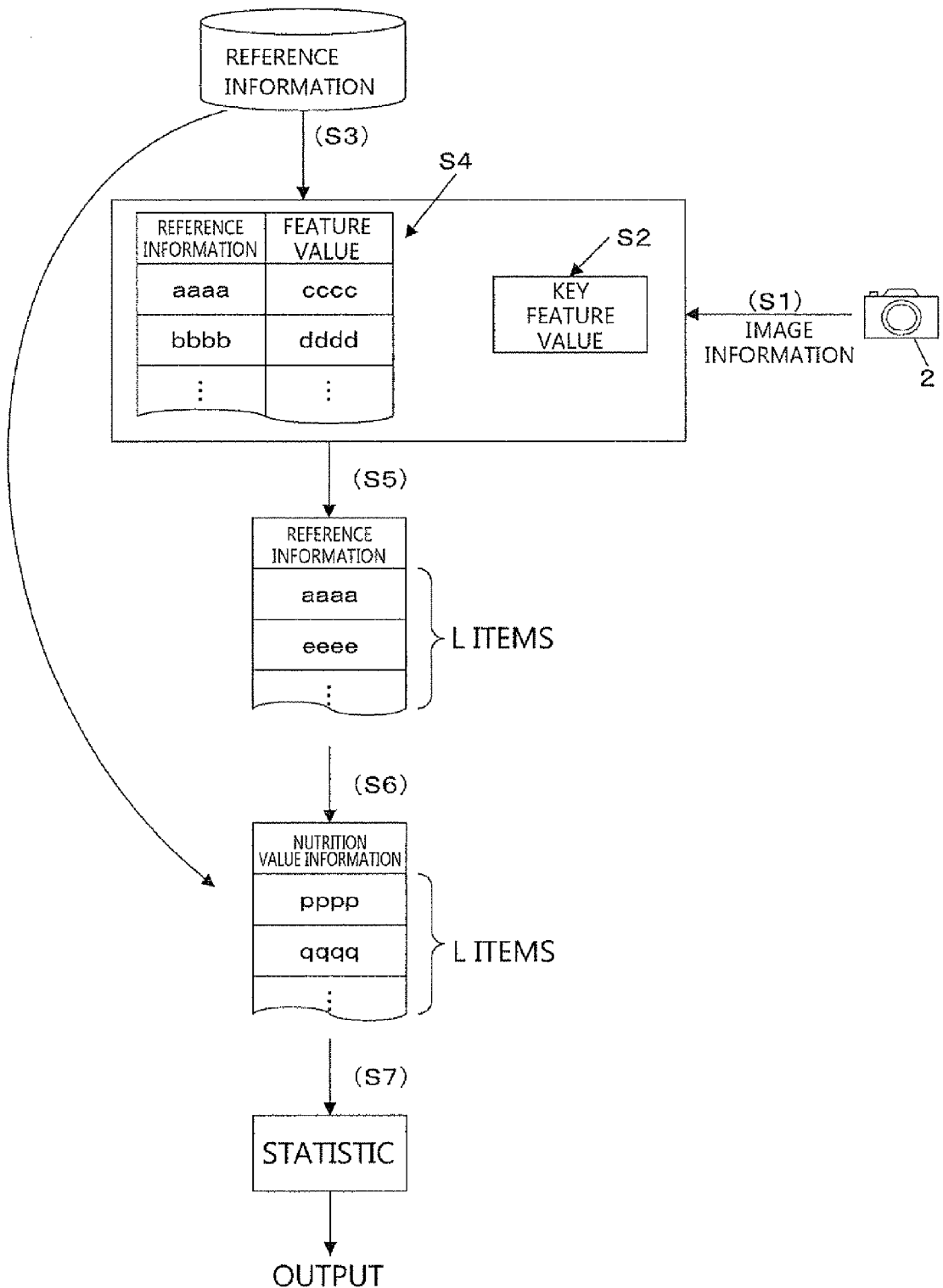
FIG. 8 explains an example operation of an information processing device according to an embodiment of the present invention.

According to the information processing device 1 in the first example of this embodiment, as shown in FIG. 8, a plurality of reference information pieces are stored in a single area in the storage unit 12. The information processing device 1 receives image information obtained by capturing an image of at least one dish or a drink (S1), and using the image information received as a key, calculates the value of a one predetermined kind of image feature as to the query image information received (S2). Further, the information processing device 1 sequentially reads the reference information pieces stored in the storage unit 12 (S3), then calculates the value of a predetermined kind of image feature as to the image information included in each of the reference information pieces, and records the calculated image feature value so as to be correlated to information specifying the corresponding reference information (S4). Still further, the information processing device 1 compares the image feature value (key feature value) calculated as to the query image information and the image feature value calculated at step S4 as to the image information included in each of the reference information pieces to select the top L number of image feature values in order of closeness to the key feature value, from closest to furthest (S5), and retrieves nutrition value information pieces included in the respective pieces of reference information specified by the pieces of respective information that are recorded so as to be correlated to the selected L number of respective image feature values (S6). Thereafter, the information processing device 1 calculates a statistic of the retrieved nutrition value information pieces to output (S7).

Figure 9:
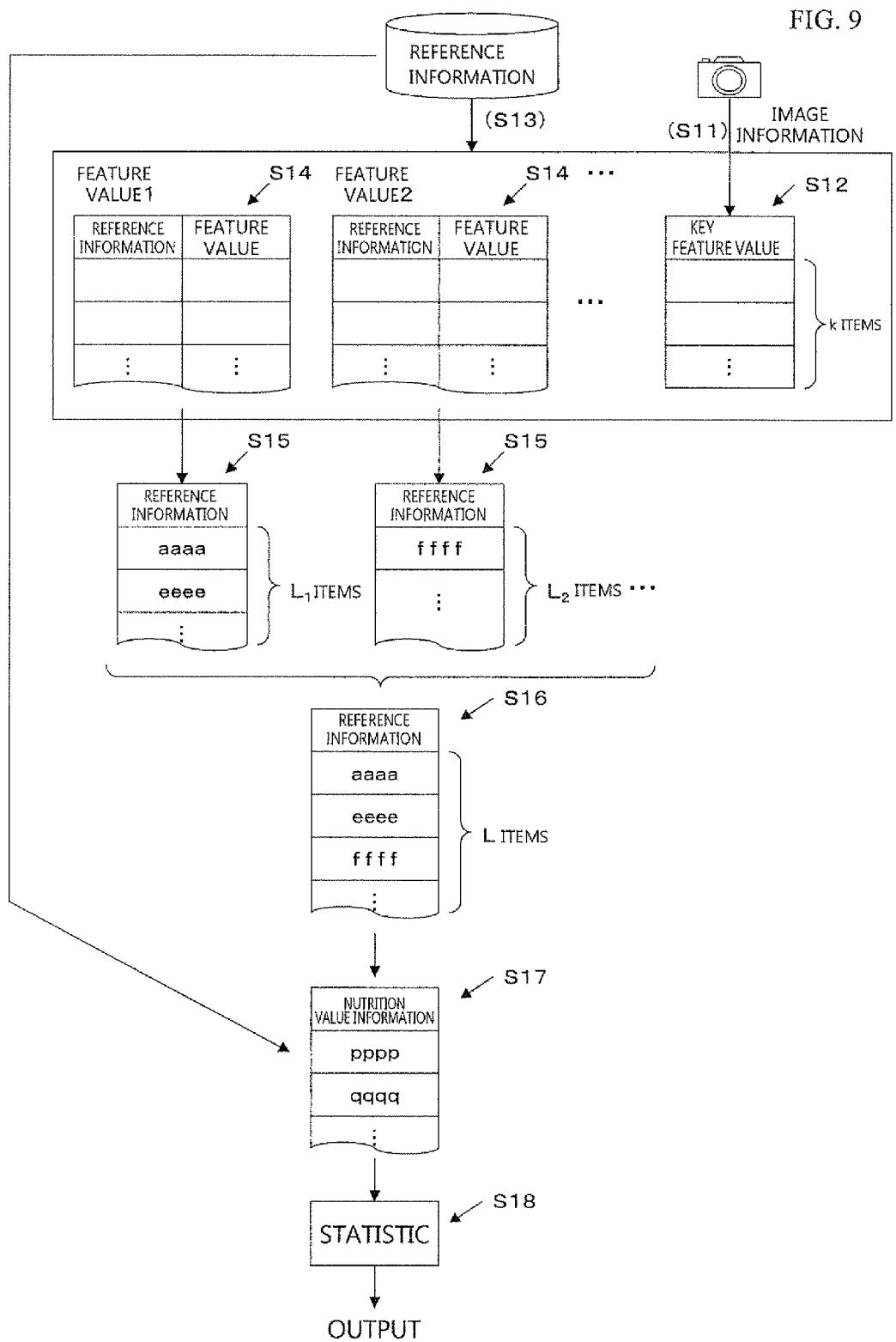
FIG. 9 explains another example operation of an information processing device according to an embodiment of the present invention.

According to the information processing device 1 in the second example of this embodiment, as shown in FIG. 9, a plurality of reference information pieces are stored in a single area in the storage unit 12. The information processing device 1 receives image information obtained by capturing an image of at least one dish or a drink (S11), and using the received image information as a key, calculates the k predetermined kinds (two or more) of image feature values as to the query image information (S12). Further, the information processing device 1 sequentially reads reference information pieces stored in the storage unit 12 (S13), then calculates the k predetermined kinds (two or more) of image feature values as to the image information included in each of the reference information pieces, and records the calculated k kinds of image feature values so as to be correlated to information specifying the corresponding reference information item (S14).

Thereafter, the information processing device 1 retrieves the $i^{th}$ (i=1, 2, . . . k) key feature value Fi from among the k kinds of image feature values (key feature value Fj, j=1, 2, . . . k) calculated as to the query image information, then compares the retrieved feature value Fi and an image feature value corresponding to the retrieved key feature value Fi among the k kinds of image feature values calculated at step S14 as to the image information included in each of the pieces of respective reference information, and selects the top Li number of image feature values in order of closest to the key feature value Fi, from closest to furthest (S15).

The information processing device 1 repetitively execute these steps S14 and S15 while sequentially incrementing i by one until k (the initial value of i is set to "1") to obtain the union of a set of the image feature values selected in the repetitive executions, then obtains information pieces recorded so as to be correlated to the L=Σ(Li) (the sum of Li, where i=1, 2, . . . k) number of respective image feature values included in the union (S16), and retrieves nutrition value information pieces included in the respective reference information pieces specified by the obtained respective information pieces (S17). Thereafter, the information processing device 1 calculates a statistic of the nutrition value information pieces retrieved to output (S18).

Note that the reference information pieces including similar images found in the repetitive executions of the steps S14 and S15 may be overlapped. That is, a similar image X may be found based on the first kind of image feature value, and the same similar image X may be found based on the second kind of image feature value. In such a case, overlapping of similar images X is allowed here, and the overlapped similar images X are included in a retrieval result (that is, a value including an additional value corresponding to the overlapped images is output as a statistic of the pieces of the nutrition value information included in the respective reference information pieces so as to be correlated to the respective similar images X). Alternatively, processing for excluding overlapped images may be executed in such a overlapped case. In this case, the number of similar images that area found in the repetitive executions of the steps S14 and 15 is smaller than L.

Figure 10:
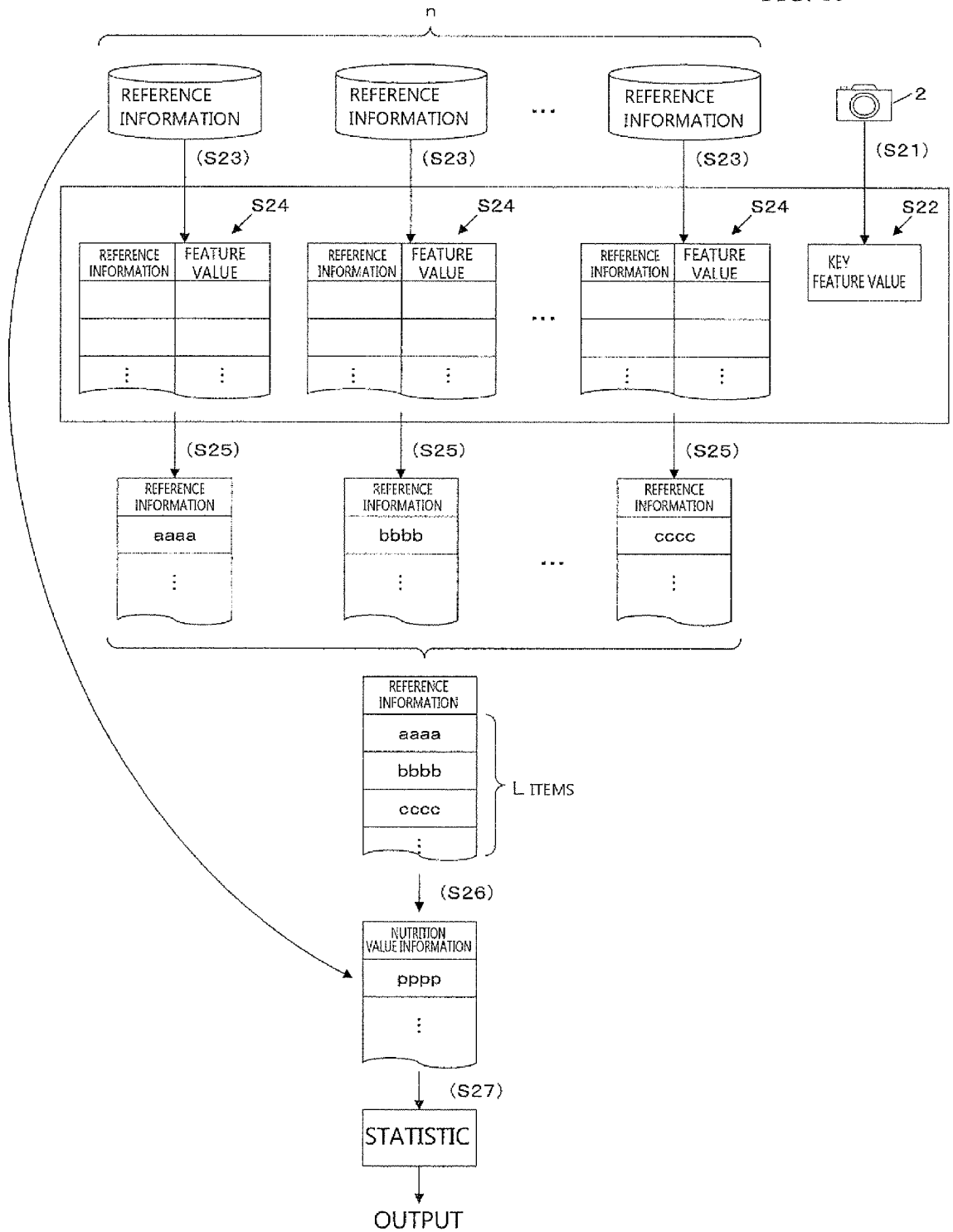
FIG. 10 explains still another example operation of an information processing device according to an embodiment of the present invention.

Further, according to the information processing device 1 in the third example of this embodiment, as shown in FIG. 10, the n (two or more) number of recording areas are endured in the storage unit 12, and a plurality of reference information are stored in each of the recording areas. The information processing device 1 receives image information obtained by capturing an image of at least one dish or a drink (S21), and using the received image information as a key, calculates the value of one predetermined kind of image feature as to the query image information (S22). Further, the information processing device 1 sequentially reads the plurality of reference information pieces stored in the $i^{th}$ recording area in the storage unit 12 (S23), then calculates the value of the predetermined kind of image feature as to the image information included in each of the reference information pieces, and records the calculated image feature value so as to be correlated to information specifying the corresponding reference information item (S24).

Thereafter, the information processing device 1 compares the image feature value (key feature value) calculated as to the query image information and the image feature value calculated at step S24 as to the image information included in each of the reference information pieces, and selects the top Li number of image feature values in order of closeness to the key feature value, from closest to furthest (S25).

The information processing device 1 repetitively executes the steps S14 and S15 while sequentially incrementing i by one until k (the initial value of i is set to "1") to obtain the union of a set of the image feature values selected in the repetitive executions, then obtains information pieces recorded so as to be correlated to the L=Σ(Li) (the sum of Li, where i=1, 2, . . . k) number of respective image feature values included in the union, and retrieves nutrition value information pieces included in the respective reference information pieces specified by the obtained respective information pieces (S26). Thereafter, the information processing device 1 calculates a statistic of the nutrition value information pieces retrieved to output (S27).

Figure 11:
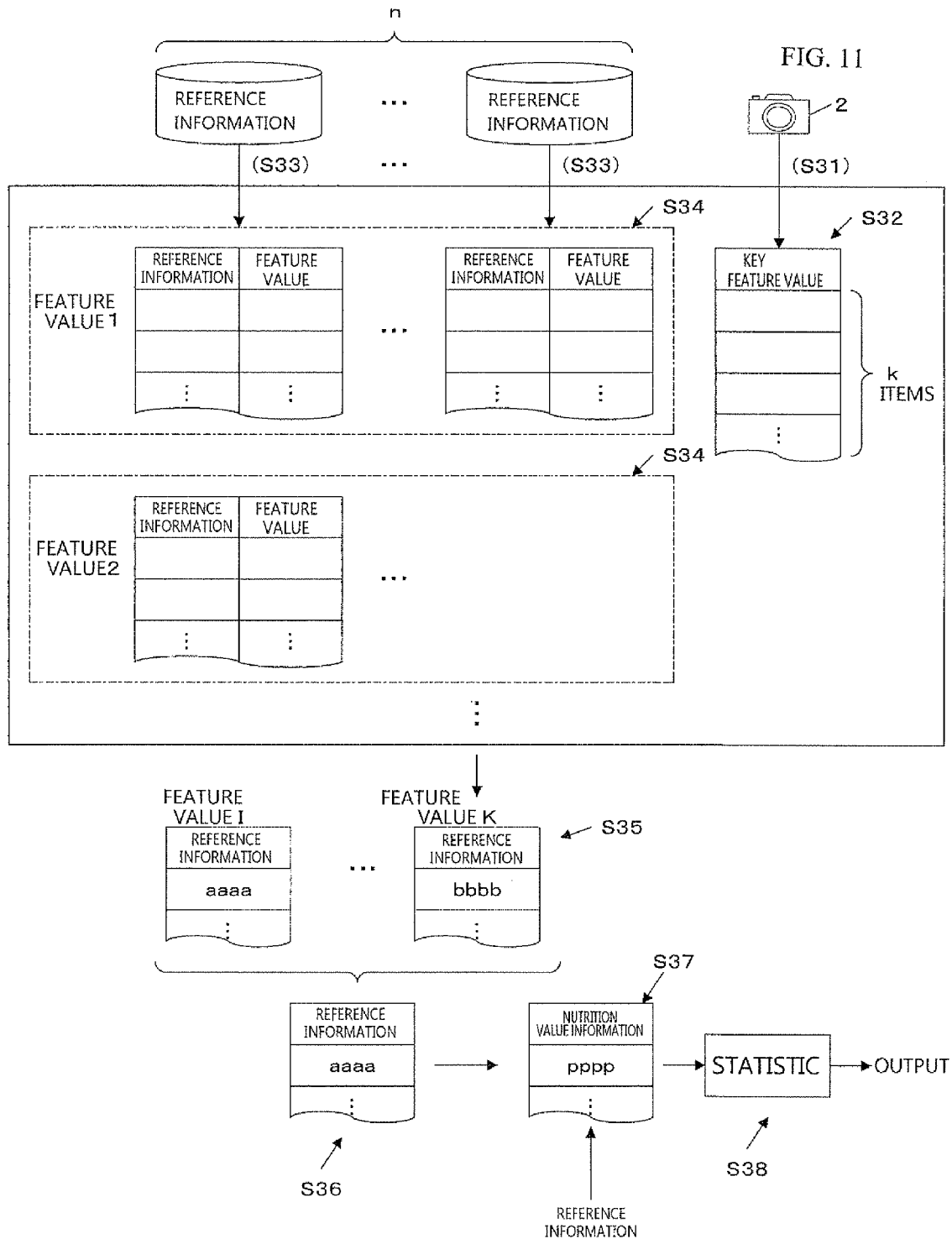
FIG. 11 explains yet another example operation of an information processing device according to an embodiment of the present invention.

According to the information processing device 1 in the fourth example of this embodiment, as shown in FIG. 11, the n (two or more) number of recording areas are ensured in the storage unit 12, and a plurality of reference information pieces are stored in each of the recording areas.

The information processing device 1 receives image information obtained by capturing an image of at least one dish or a drink (S31), and using the received image information as a key, calculates the k predetermined kinds of image feature values as to the query image information (S32). Further, the information processing device 1 sequentially reads the plurality of reference information pieces stored in the $i^{th}$ recording area in the storage unit 12 (S33), then calculates the k predetermined kinds of image feature values as to the image information included in each of the reference information pieces, and records the k predetermined kinds of image feature values calculated so as to be correlated to information specifying the corresponding reference information item (S34).

Thereafter, the information processing device 1 retrieves the $j^{th}$ (j=1, 2, . . . k) key feature value Fj from among the k kinds of image feature values (key feature value Fj, j=1, 2, . . . k) calculated as to the query image information, then compares the retrieved feature value Fj and an image feature value corresponding to the retrieved key feature value Fj among the k kinds of image feature values calculated as to the image information included in each of the respective reference information pieces held in the $i^{th}$ recording area, and selects the top Pj number of image feature values, in order of closeness to the key feature value Fj, from closest to furthest (S35).

The information processing device 1 repetitively executes the step S35 while sequentially incrementing j by one until k (the initial value of j is set to "1") to obtain the union of a set of the image feature values selected in the repetitive executions, and obtains information pieces recorded so as to be correlated to the Li=Σ(Pj) (the sum of Pj, j=1, 2, . . . k) number of respective image feature values included in the union (S36).

Further, the information processing device 1 repetitively execute the steps S33 to S36, while sequentially incrementing i by one (the initial value of i is set to "1") to obtain the union of a set of the image feature values selected in the repetitive executions, then obtains information pieces recorded so as to be correlated to the L=Σ(Li) (the sum of Li, where i=1, 2, . . . n) number of respective image feature values included in the union, and retrieves nutrition value information pieces included in the respective reference information pieces specified by the respective information pieces obtained (S37). Thereafter, the information processing device 1 calculates a statistic of the nutrition value information pieces retrieved to output (S38).

In the fourth example as well, the reference information pieces including similar images found in the repetitive executions of the steps S35 and S36 may be overlapped. That is, a similar image X may be found based on the first kind of image feature value, and the same similar image X may be found based on the second kind of image feature value. In such a case, overlapping of similar images X is allowed here, and the duplicated similar images X are included in a retrieval result (that is, a value including an additional value corresponding to overlapped images is output as a statistic of the nutrition value information pieces included in the respective reference information pieces so as to be correlated to the respective similar images X). Alternatively, processing for excluding duplication may be executed in such a case. In this case, the number of similar images that are found in the repetitive executions of the steps S35 and S36 is smaller than L.

[Recording of Reference Information]

In this embodiment, the reference information can be generated as follows. That is, captured images of a plurality of pieces of food or drink are prepared in advance, and a user is requested to input nutrition value information, such as an estimated calorie value, of at least one dish or a drink shown in the image, while being sequentially presented with the respective images. The nutrition value information input by the user is recorded as reference information so as to be correlated to the corresponding image.

As described above, in this embodiment, an estimated nutrition value in each reference information item is not necessarily correct as it is sufficient to obtain information as collective intelligence. That is, a user may input a value which the user thinks appropriate for the image, based on his/her own feeling.

Further, in another example, input of nutrition value information, such as an estimated calorie value, of at least one dish or a drink of which image is captured is requested for every capturing of an image of at least one dish or a drink by a user, and the nutrition value information input by the user may be recorded as reference information so as to be correlated to the corresponding image. In this case as well, it is sufficient for a user to input a value which the user thinks appropriate, based on the image and his/her own feeling.

[Recognition of Plate]

In this embodiment, when the control unit 11 receives image information (when operating as the image receiving unit 22), the image and size of a plate included in the image information received may be recognized, and the result of recognition may be utilized in calculation of nutrition value information.

In this example, image information included in the reference information as well is arranged in advance as follows. That is, the reference information in this example includes image information on at least one dish or a drink placed (or put) on one plate. Further, information on the size of the plate is input either as a value of the area of the plate, for example, or as a string of letters, such as "large", "middle", "small" or the like, and recorded in the reference information.

Upon receipt of image information to be processed, the control unit 11 divides the image information into pieces for every plate included in the image information. Note that recognition of the image of a plate is achieved by detecting a round or rectangular contour line, for example. This is a result of utilization of a fact that at least one dish or a drink is generally not round or rectangular. Then, the control unit 11 makes the image information pieces resulting from dividing for every plate an output from the image receiving unit 22.

In the above, input of information on the size of a plate included in each of the image information pieces resulting from dividing may be received from a user. As an example, such information may be input as a string of letters, such as "large", "middle", "small", or the like.

When the image capturing device 2 outputs meta data, such as information on a focal distance or the like, the area of a plate may be estimated based on the information on the focal distance and the size of the image. As a widely known method can be used for the estimation method, a detailed description thereof is not made here.

In the above described processing, a similar image as to the image information for every plate is retrieved from reference information. Then, for every reference information item, a ratio V/U between the information U on the size of a plate correlated to the image information included in the reference information and the information V on the size of a plate included in the query image information (image information resulting from dividing for every plate) is multiplied to the nutrition value information included in the corresponding reference information, to thereby calculate a statistic.

Note that, to specify the size of a plate, using a string of letters, such as "large", "middle", "small" or the like, the ratio between "large", "middle", "small" is determined in advance as 1.5:1:0.7, or the like, to obtain the ratio V/U.

In this example, the image information captured and input into the information processing device 1 is divided into image information pieces each including one plate, and a statistic of nutrition value information is obtained for every image information piece resulting from dividing. Then, the information processing device 1 may accumulate the statistics obtained for the respective image information pieces resulting from dividing to output as nutrition value information on at least one dish or a drink included in the entire image information captured.

Modified Example

Further, as the above-described fourth example, in a case where the k kinds (two or more) of image feature values are calculated as to reference information pieces stored in a plurality of recording areas, the k kinds of image feature values are calculated as to reference information stored in each of the recording areas in the above description. However, this embodiment is not limited to the above, and, for example, one kind of image feature value may be selected as a corresponding feature value from among the k kinds of image feature values for every recording area for holding reference information, and the value of the selected corresponding feature may be calculated as to image information in the reference information read from the corresponding recording area.

That is, one kind of image feature value is correlated to each recording area, and a similar image similar to the input (key) image information is retrieved for every recording area, based on the corresponding image feature value.

In this case, a similar image is retrieved from each recording area (corresponding to each individual knowledge), based on an corresponding image feature value (corresponding to individual sense of evaluation on nutrition value). This can provide a result closer to collective intelligence.

Another Modified Example

In the above description, an example has been described in which the statistic calculating unit 25 averages the L number of nutrition value information pieces input. However, as described above, the statistic calculation by the statistic calculating unit 25 is not limited to one for a simple average, but a weighted average may be used. For example, suppose that the L number of nutrition value information pieces (estimation values) are defined as $x_1, x_2, \ldots x_L$, and the image feature values correlated to the respective estimation values are defined as $p_1, p_2, \ldots p_L$. In this case, the statistic calculating unit 25 calculates a statistical value X as $X=a_1 \cdot x_1+a_2 \cdot x_2+\ldots+a_L \cdot x_L+b$, and outputs the statistical value X to the output unit 26, wherein $a_i$ ($i=1, 2, \ldots L$) and b are predetermined coefficients, and the output unit 26 may show the information output by the statistic calculating unit 25 on the display unit 14 to output.

In the above, the coefficients $a_i$ ($i=1, 2, \ldots L$) and b are determined as follows, for example. That is, the coefficient $a_i$ may be a value that becomes larger when the difference $|p_i-p_K|$ ($|*|$ means the absolute value of *) between the image feature value $p_i$ correlated to corresponding (multiplied) nutrition value information $x_i$ ($i=1, 2, \ldots L$) and the key feature value $p_K$ to be compared with the image feature value $p_i$ becomes smaller. The coefficient b may be 0. Alternatively, the coefficient b may be a negative value when it is determined based on an experience that the statistical value X tends to be calculated higher than the nutrition value information as it should be, or a positive value when the statistical value X tends to be calculated lower than the nutrition value information as it should be. In this manner, the coefficient b may be used for adjustment of a result. However, the manner of determination of the coefficient b is not limited to the above.

Besides the above, for example, the information processing device 1 sorts the L number of pieces of nutrition value information $x_j$ (j being any of $1, 2, \ldots L$) in an ascending (or descending) order of the differences $|p_j-p_K|$ between the respective image feature values $p_j$ correlated to respective nutrition value information pieces xj and the key feature value pK to be compared with the image feature values pj, and obtain xi (i=1, 2, ..., L) as a result of sorting. That is, x1, x2, ..., xL is obtained as a result of sorting xi so as to hold |pi−1−pK|<|pi−pK| or |pi−1−pK|>|pi−pK|).

Then the information processing device 1 compute X=a1−x1+a2−x2+ ... +aL−xL+b for each of a plurality of images having known nutrition value information as samples, where the images are sampled in advance, and processing for obtaining the L number of pieces of nutrition value information (processing in FIGS. 8 to 11) is executed (in the above, the above mentioned X is calculated in each statistic calculation), using key feature values obtained from the respective sample images, to obtain X for every sample. In the above, the coefficients ai (i=1, 2, ... L) and b are adjusted such that the X for every sample becomes closer to the known nutrition value information for every sample. As a widely known optimum processing method (for example, Lagrange multiplier, or the like) can be used for the adjustment processing, a detailed description is not made here.

The calculation by the statistic calculating unit 25 may be one using a function. That is, the statistic calculating unit 25 may use a separately determined function f as a statistical value X to obtain X=f(x1, x2, ..., xL), wherein the function f may be a linear or non-linear function.

[Use of Meal Balance Information]

In an example with plate recognition, the information processing device 1 in this embodiment may utilize not only the size of a plate but also color information on an inside area of the plate (for example, the average of brightness and/or color phase values of pixels in the area of one plate) to estimate whether the food on the plate is a staple food (rice, breads: generally having higher brightness), a side dish (vegetables and so forth: generally having lower brightness and color phase closer to green or yellow), or a main meal (meat, fish, or the like: color phase closer to brown or red). In this case, as to image information for each plate, at least one similar image is retrieved from the reference information to obtain nutrition value information correlated to the similar image, and information for discrimination between a staple food, a side dish, and a main meal is obtained for the plate, based on the average of the brightness and/or color phase values of the pixels of each plate.

Further, in this case, general nutrition value information (hereinafter referred to as meal balance nutrition value information) is stored in the storage unit 12 as to a staple food, a side dish, and a main meal, respectively. Utilizing the information, the information processing device 1 obtains meal balance nutrition value information for every plate, based on the information indicating a staple food, a side dish, or a main meal, determined for each plate. The information processing device 1 executes a calculation using nutrition value information correlated to a similar image obtained for every plate, and meal balance nutrition value information (this calculation may be a calculation to obtain, for example, an average or a weighted average, as described above). Further, the calculation may be made by multiplying a ratio V/U between the information U on the size of a plate correlated to image information included in the reference information and information V on the size of a plate included in the query image information (image information piece resulting from dividing for every plate) to the nutrition value information included in corresponding reference information.

DESCRIPTION OF REFERENCE NUMERALS 1 information processing device, 2 image capturing device, 11 control unit, 12 storage unit, 13 operating unit, 14 display unit, 21, 21' reference information obtaining unit, 22 image receiving unit, 23, 23' similar image retrieving unit, 24 corresponding information obtaining unit, 25 statistic calculating unit, 26 output unit.

Figure 3:
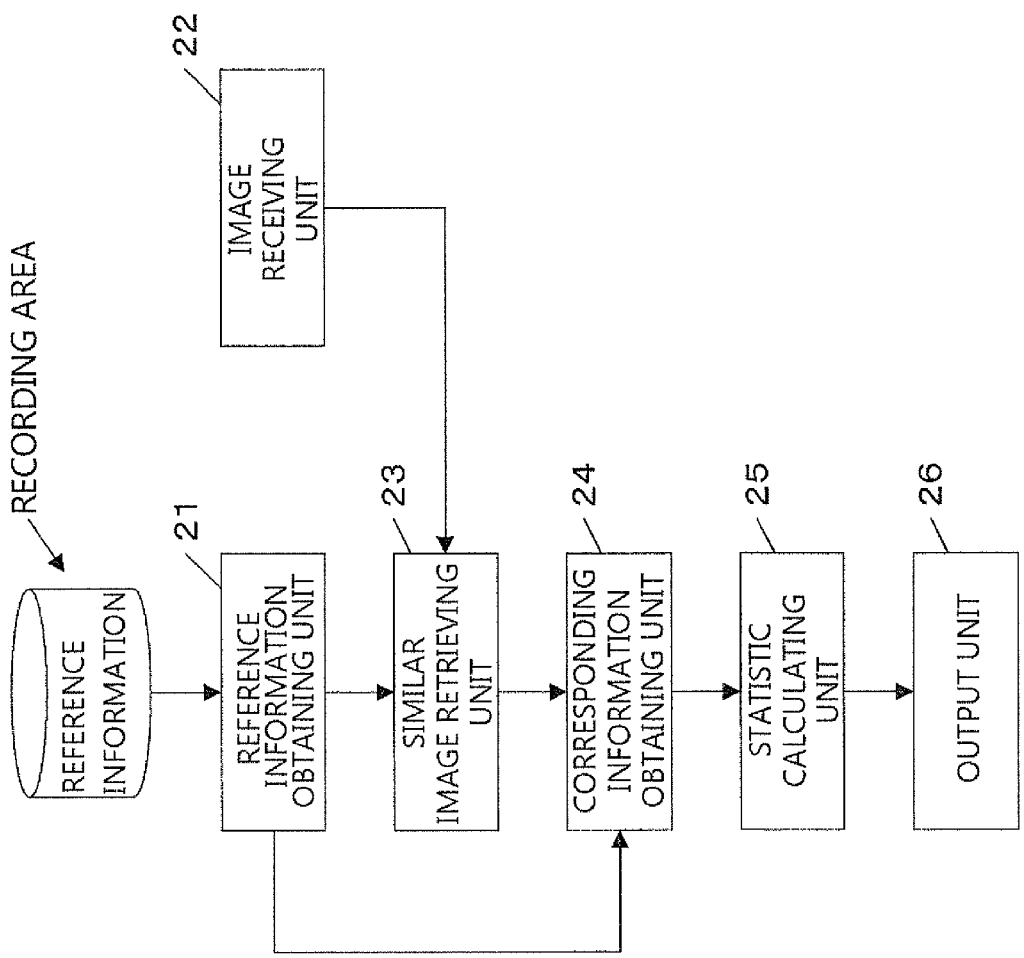
FIG. 3 is a functional block diagram showing one example of an information processing device according to an embodiment of the present invention.
Figure 5:
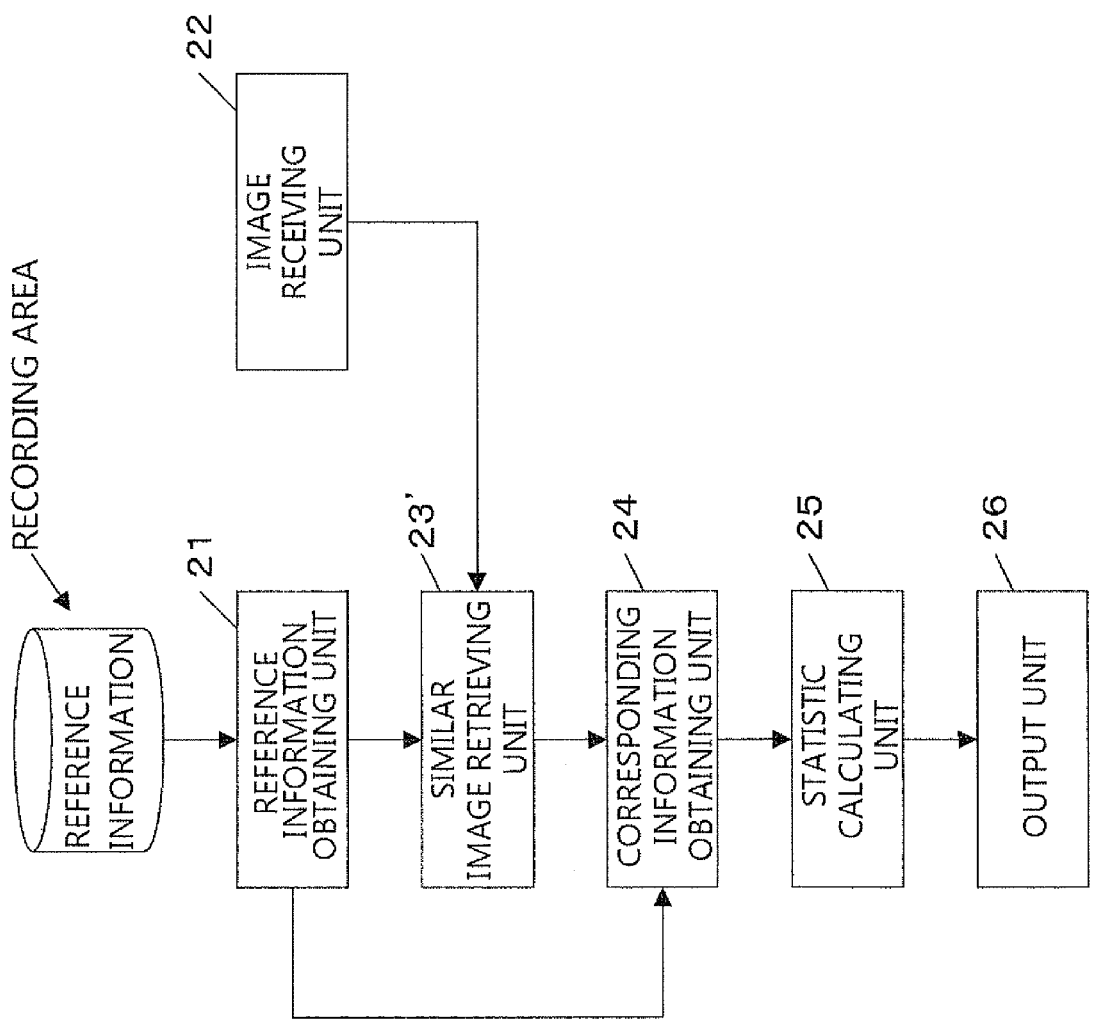
FIG. 5 is a functional block diagram showing another example of an information processing device according to an embodiment of the present invention.
Figure 6:
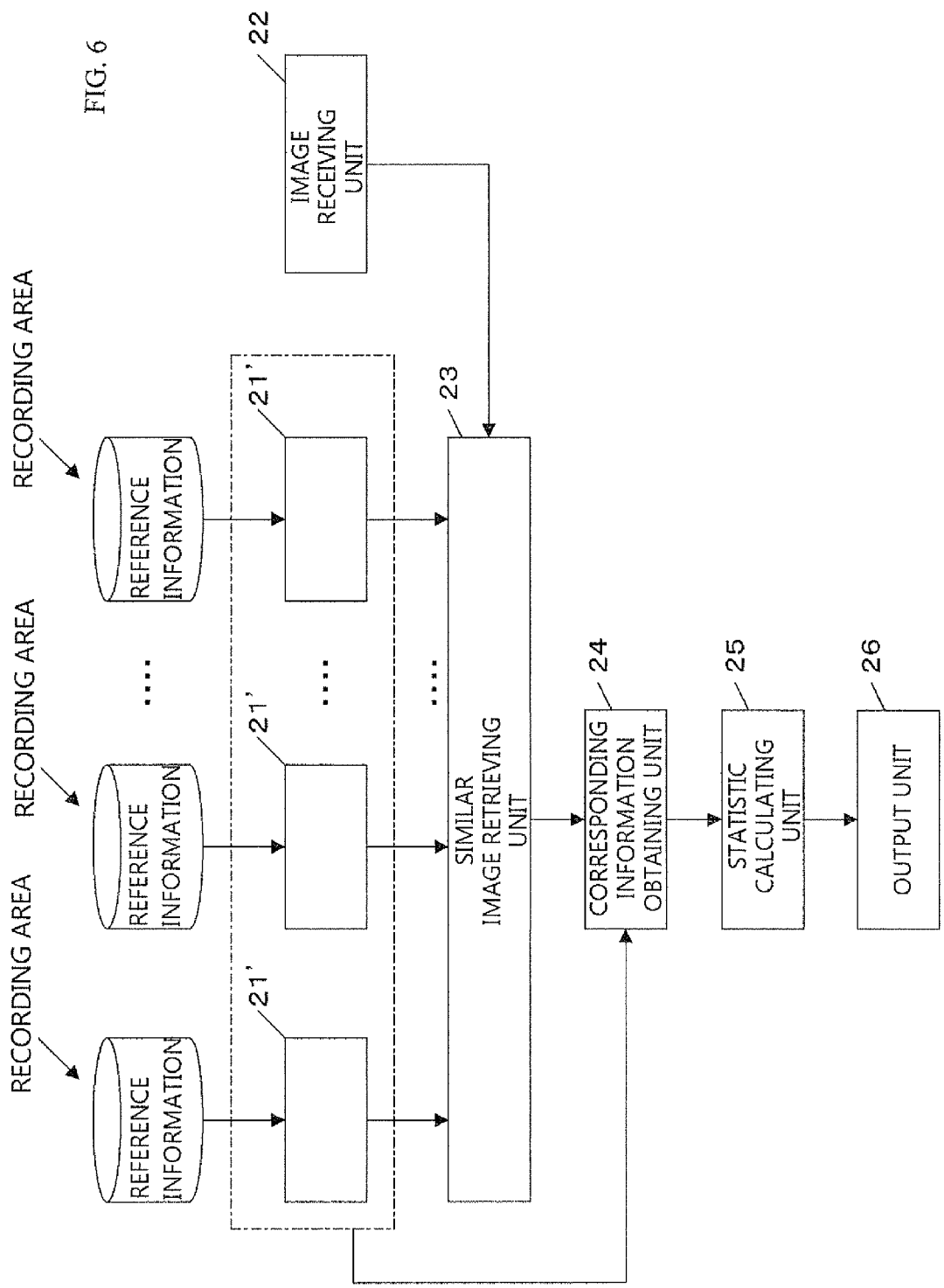
FIG. 6 is a functional block diagram showing further another example of an information processing device according to an embodiment of the present invention.

FIG. 1
2 IMAGE CAPTURING DEVICE
11 CONTROL UNIT
12 STORAGE UNIT
13 OPERATING UNIT
14 DISPLAY UNIT
FIG. 2
IMAGE INFORMATION
NUTRITION VALUE INFORMATION
FIGS. 3, 5, 6
RECORDING AREA
REFERENCE INFORMATION
21 REFERENCE INFORMATION OBTAINING UNIT
22 IMAGE RECEIVING UNIT
23 SIMILAR IMAGE RETRIEVING UNIT
24 CORRESPONDING INFORMATION OBTAINING UNIT
25 STATISTIC CALCULATING UNIT
26 OUTPUT UNIT
FIG. 4
ESTIMATION
FIG. 7
IMAGE INFORMATION
NUTRITION VALUE INFORMATION
RECORDING AREA 1
RECORDING AREA 2
FIG. 8
REFERENCE INFORMATION
FEATURE VALUE
KEY FEATURE VALUE
IMAGE INFORMATION
L ITEMS
STATISTIC
OUTPUT
FIGS. 9, 10, 11
REFERENCE INFORMATION
FEATURE VALUE
KEY FEATURE VALUE
K ITEMS
L ITEMS
NUTRITION VALUE INFORMATION
STATISTIC
OUTPUT

What is claimed is:

1. An information processing device, comprising:
a storage unit that holds (i) a program, and (ii) reference information including a captured image of at least one dish or drink and nutrition value set for the dish or drink included in the image, so as to be correlated to each other; and
a control unit configured to execute the program stored in the storage unit to (i) receive an image including at least one dish or drink; (ii) retrieve L number of images similar to the received image from the reference information held in the storage unit (iii) calculate a statistic of L number of nutrition values respectively correlated to the L number of retrieved images; and (iv) output the statistic calculated.

2. The information processing device according to claim 1, wherein the control unit is further configured to retrieve the L number of images using a plurality of different methods of similar image retrieval.

3. The information processing device according to claim 1, wherein
   the storage unit includes an N (n>=2) number of storage unit elements holding different reference information units, and
   the control unit is configured to retrieve the L number of images from an M (n>=m>=2) number of storage unit elements selected from among the N number of storage unit elements.

4. The information processing device according to claim 1, wherein the control unit is a processor and the storage unit is computer readable medium.

* * * * *